J. B. DENGLER.
TOOL HOLDER.
APPLICATION FILED MAR. 19, 1917.
1,248,280.
Patented Nov. 27, 1917.
2 SHEETS—SHEET 1.
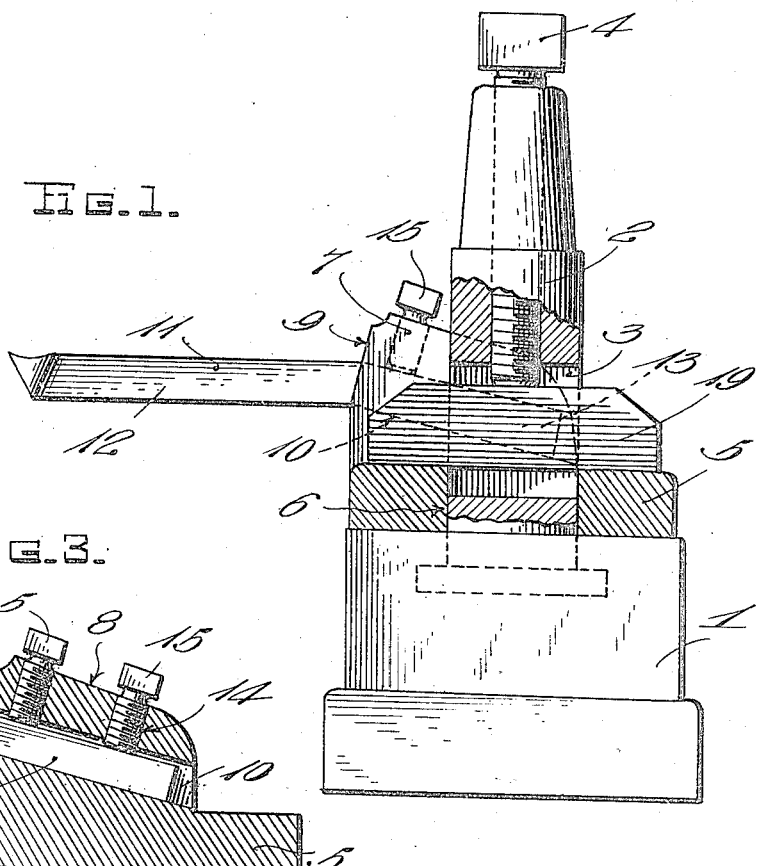
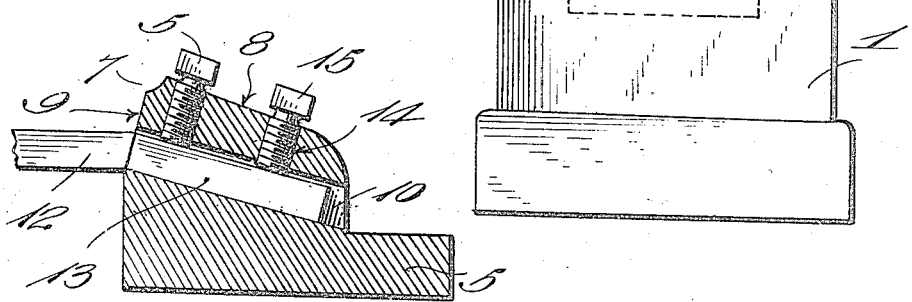
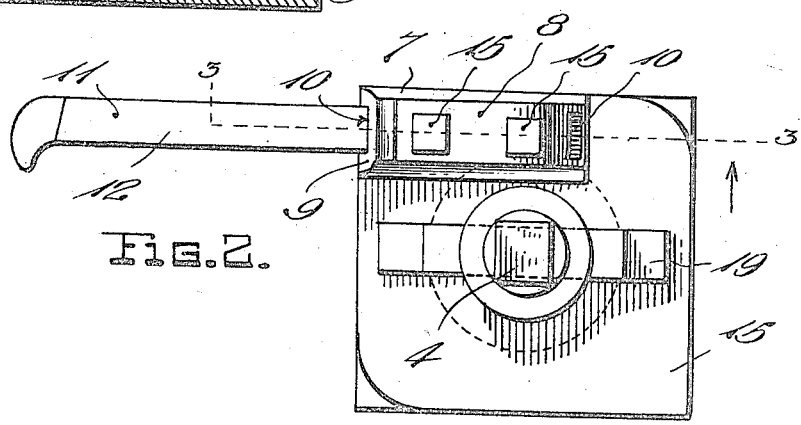
Witness
Inventor
J. B. Dengler
by
Attorneys

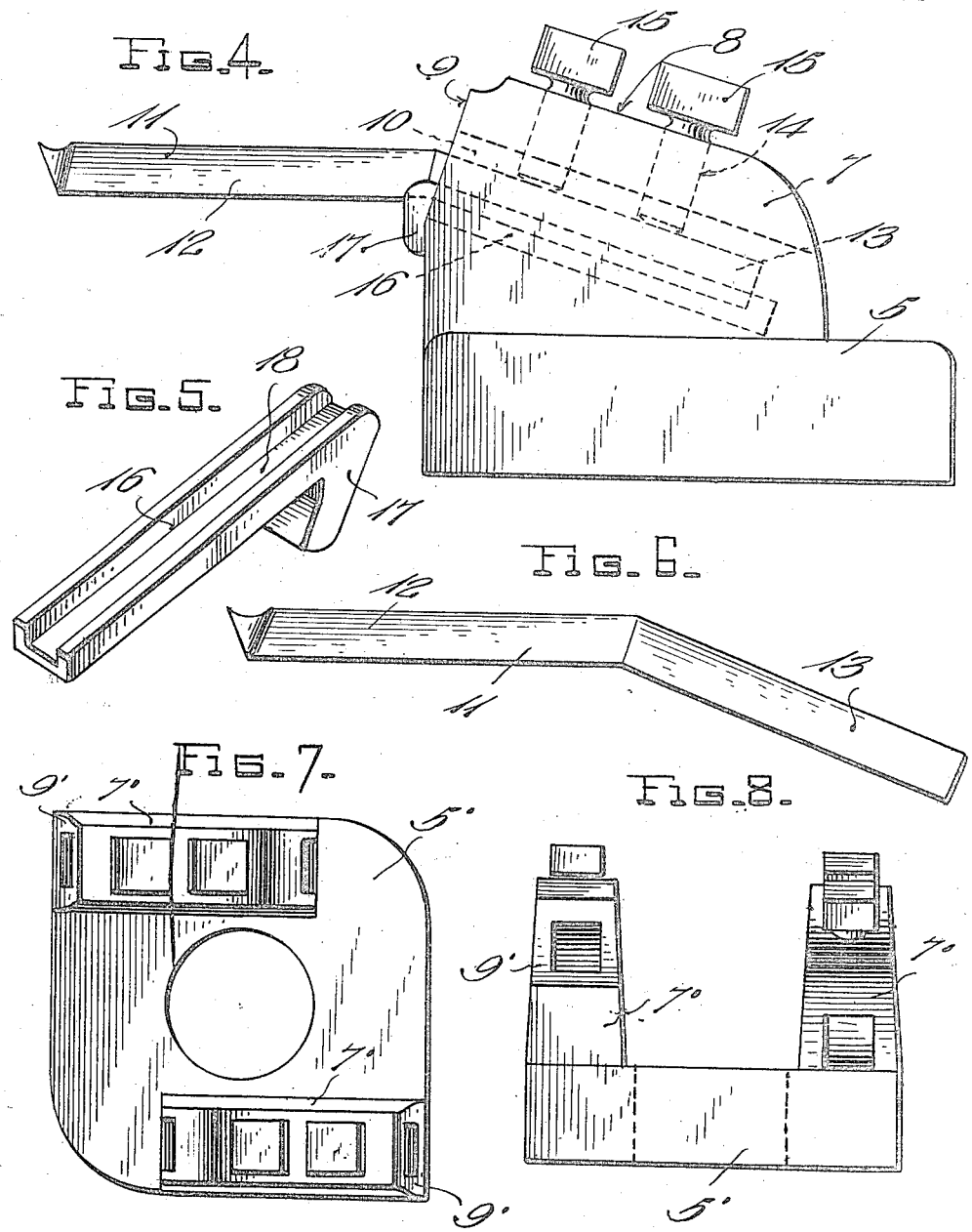

UNITED STATES PATENT OFFICE.

JOHN B. DENGLER, OF OIL CITY, PENNSYLVANIA.

TOOL-HOLDER.

1,248,280.

Specification of Letters Patent.    Patented Nov. 27, 1917.

Application filed March 19, 1917.   Serial No. 155,805.

*To all whom it may concern:*

Be it known that I, JOHN B. DENGLER, a citizen of the United States, residing at Oil City, in the county of Venango and State of Pennsylvania, have invented certain new and useful Improvements in Tool-Holders; and I do declare the following to be a full, clear, and exact description of the invention, such as will enable others skilled in the art to which it appertains to make and use the same.

My invention relates to tools and has for its object to provide a tool holder which is designed to economize in material and to allow of a better range of adjustment of the tool than can be obtained with the majority of tool holders of the present day type.

Another object of my invention is to provide a tool holder which is supported on the lathe carriage and not in the tool post as in the majority of holders.

A further object of my invention is to provide means whereby different sized tools may be employed without changing the construction of the tool holder or the clamped adjustment thereof.

A still further object of my invention is to provide a tool holder which has relatively free movement about the tool post or the lathe upon which it is employed.

To this end my invention consists of the novel construction and combination of parts to be more fully hereinafter described and claimed, and in which the accompanying drawings form part of the specification.

In the accompanying drawings:

Figure 1 is a side elevation of my tool holder partly in section;

Fig. 2 is a horizontal plan view;

Fig. 3 is a sectional elevation of the holder on the line 3—3 of Fig. 2;

Fig. 4 is a side elevation of the holder illustrating the reducing bushing;

Fig. 5 is a perspective view of the bushing;

Fig. 6 is an elevation of the tool;

Fig. 7 is a plan view of a modified form of my invention, and

Fig. 8 is a front elevation of the same.

Referring to the drawings, 1 is an ordinary lathe carriage provided in the usual manner with a tool post 2 having the ordinary slot 3 therein, and provided at its top with a clamping screw 4. This is the ordinary type of construction and is merely shown to illustrate the application of my invention. Seated on the lathe carriage 1 and surrounding the tool post 2, is a base or bed plate 5 provided with a central bore 6 to receive the tool post. The bore 6 is of sufficient diameter to allow of the base plate 5 being rotated about the post 2.

The base plate 5 is substantially square in outline and is provided at one corner with an upright lug 7.

The lug 7 is provided with a front face 9 the lower portion of which is flush with the front edge of the plate 5 while the upper portion receeds at a slight angle. The lug 7 is also provided with a rearwardly and downwardly inclined top edge 8. This lug 7 is also provided with a downwardly and rearwardly inclined square bore 10. This bore 10 extends entirely through the lug 7, having its ends in the end faces of the lug, the highest end of the bore being located in the front face 9 of the lug 7.

In conjunction with this holder a tool 12 is provided having a shank 11 with a bent portion 13 at one end. This bent portion 13 is adapted for insertion in the socket formed by the bore 10 of the lug 7. The straight portion of the shank 11 may be of any length desired and is extended horizontally beyond the lug 7 for application to the material carried on the lathe spindle as desired. Owing to this feature of construction, it is merely necessary to move the tool 12 horizontally when it is desired to adjust the same as this movement will cause the portion 13 seated in the bore or socket 10 to move either upwardly or downwardly in the socket, according to the direction of horizontal movement of the tool 12. It will be seen that this provides a range of vertical as well as horizontal adjustment of the tool obtainable at one movement of the tool, and is a great improvement over the ordinary type of tool holder which requires two or three different adjustments to obtain the same result.

The top edge 8 of the lug 17 is provided with internally threaded bores 14 which communicate with the bore 10; set screws 15 are positioned in these bores and are readily adjustable therein to clamp down upon the portion of the shank of the tool which is inserted in the socket or bore 10. The lug 7 may be provided with one or more of these set screws, as desired.

When it is desired to use tools having shank of smaller dimension than the bore or socket 10, a spacer 16 is placed in the bore. This spacer 16 is provided with a downwardly extending lip 17 for engagement with the front face 9 of the lug 7 to hold the same within the bore.

The spacer is provided on its upper face with a channel 18 extending the entire length of the spacer and is adapted to receive the shank of the tool desired to be clamped in the lug 7. It will be readily seen that this spacer need not be of any specific construction but may be varied to suit the individual character of the tool employed.

Extending through the slot 3 of the tool post 2 and bearing upon the base plate 5, is a key block 19 which is adapted to be forced downwardly against the plate 5 when the screw 4 in the outer portion of the tool post is brought into engagement with the upper face of the key block 19. This provision of the key block 19 will provide a clamp to secure the base plate 5 upon the lathe carriage at any point desired in the adjustment of the plate 5 about the tool post 2.

In Figs. 7 and 8, I have illustrated a modification of my invention in which the base plate 5' is provided with a pair of lugs 7' at opposite corners of the plate 5'. These lugs are similar in every respect to the lug 7 herein before described, except that they are oppositely positioned with relation to their front faces 9'. Except for the above-mentioned difference the holder as shown in Figs. 7 and 8 is of exactly the same construction as the holder herein before described and is illustrated to show the application of the plurality of tool holders on the same base plate.

The operation of my device will be clearly understood from the description and it is only necessary to state briefly the manner of using the same. The plate 5 is first placed over the tool post and positioned at the point desired on the lathe carriage, after which the key block 19 is inserted in the slot 3 of the tool post and forced down against the plate by action of the screw 4, thereby clamping the plate securely on the lathe carriage 1. The bent portion of the shank of the tool is then inserted in the socket or bore 10 in the lug 7 and securely clamped therein by means of the set screws 15. When it is desired to adjust the tool it is merely necessary to loosen the set screws 15 and slide the tool horizontally in the direction desired, after which the screws 15 may be again tightened to clamp the tool in the position desired. It will thus be seen that it is not necessary to interfere in any way with the adjustment of the tool holder, which is of great importance.

What I desire to protect by Letters Patent and claim is:—

The combination of a tool having a shank bent downwardly at one end, the cutting edge of the tool being at the end of the straight portion with a holder comprising a horizontal base plate centrally apertured to receive the tool post of a lathe, an upwardly extending lug formed integral on one corner of said base plate, said lug being provided with an inclined bore for the reception of the tool and means for clamping the tool whereby the cutting edge of the tool may be adjusted in a series of horizontal planes.

In testimony whereof I have hereunto set my hand in the presence of two subscribing witnesses.

JOHN B. DENGLER.

Witnesses:
WILLIAM G. MURPHY,
HUNTER M. CRAIG.

Copies of this patent may be obtained for five cents each, by addressing the "Commissioner of Patents, Washington, D. C."